United States Patent Office 3,387,683
Patented June 11, 1968

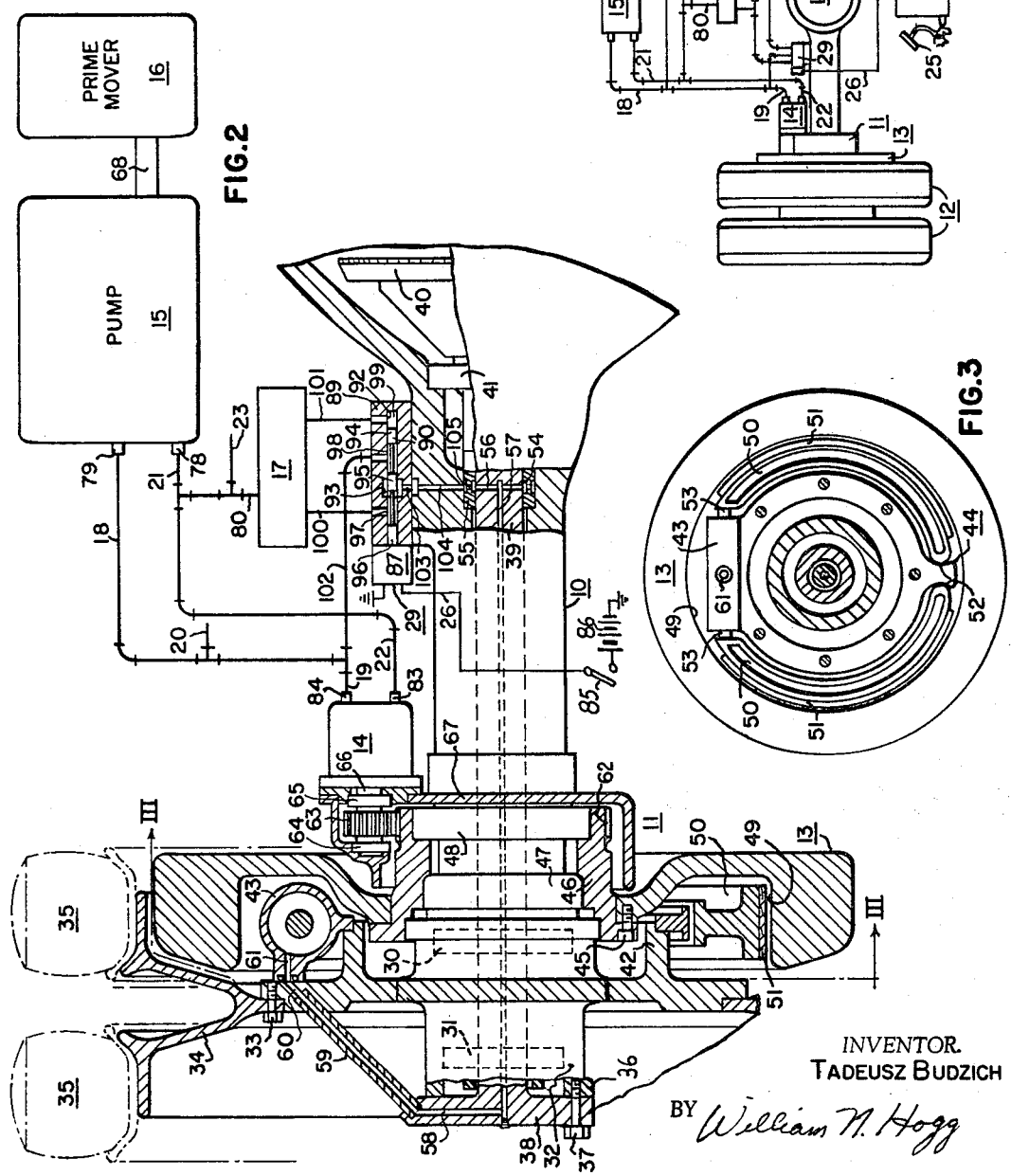

3,387,683
ENERGY STORING MECHANISM FOR
POWER DRIVE
Tadeusz Budzich, 80 Murwood Drive,
Moreland Hills, Ohio
Filed Oct. 21, 1965, Ser. No. 500,048
23 Claims. (Cl. 180—66)

ABSTRACT OF THE DISCLOSURE

An energy storing mechanism for a power driven ground vehicle wherein a fluid pressure energy translating system extracts energy from the prime mover and stores it in a flywheel. An auxiliary independent intermittent drive system is provided between the flywheels and the ground engaging wheels which is disposed to selectively drivingly engage the flywheel with the ground engaging wheel to intermittently supply additional torque to the ground engaging wheels during the peak demands of a duty cycle. The independent driving mechanism includes frictional shoes, carried by the ground engaging wheels disposed to frictionally engage the flywheel to extract the energy therefrom.

This invention relates generally to power trains of mobile machinery in which, the energy is stored in the drive line by an auxiliary power drive driving part of the working cycle to be released into said power train during peak power demands of the work cycle. In more particular aspects this invention relates to a kinetic energy storing mechanism, which stored kinetic energy can be converted into additional driving effort and superimposed upon the normal driving effort of the power train, during peak loads of the working cycle of the mobile machine.

Mobile machinery, especially in the earth-moving field, usually perform under conditions of widely varying power requirements of their duty cycle. For example, a scraper or a bulldozer requires extremely large driving efforts when large amounts of earth are being scooped or pushed, which operation is usually followed by a number of other operations, like transporting or dumping the load, which require comparatively low driving efforts. This type of duty cycle by its very nature necessitates use of large prime movers and very heavy drive lines to accommodate the peak load requirements which usually constitute a small percentage of the normal duty cycle. This practice results in very heavy and expensive machinery with a greatly over-designed power capacity with respect to the average power requirements of the duty cycle. This type of "over-design" approach carries an additional disadvantage. The widely varying torque requirements at the driving wheels usually necessitates incorporation of multi-stage mechanical gear boxes, which further increases the cost of the machine and creates greater demands on the skill of the operator.

It is therefore a principal object of this invention to provide an improved power train in which with the use of a small prime mover, the energy of the prime mover can be stored during low power periods of a duty cycle, to be released during peak power demands of the duty cycle.

Another object of this invention is to provide a secondary energy storing power drive, which can be superimposed upon the action of a conventional power train of a vehicle to provide high traction loads for short duration, corresponding with peak power demands of the vehicle duty cycle.

Still another object of this invention is to provide a secondary energy storing power drive, storing the energy from a prime mover, during periods of low power duty cycle of a vehicle, which stored energy can then be converted into the driving effort and superimposed upon the action of the primary power train during peak power requirements of the vehicle duty cycle.

Still another object of this invention is to provide a secondary energy storing power drive in the power train of a vehicle, which upon peak power demand of the vehicle will release its energy transmitting it directly to the wheels of the vehicle without imposing additional strains on the primary vehicle drive line.

Still another object of this invention is to provide a secondary energy storing fluid power drive, storing the energy, in form of kinetic energy of a flywheel located within the wheels of a vehicle, which kinetic energy can then be converted directly into the driving effort at the vehicle wheels and superimposed upon the driving effort of the mechanical drive lines during periods of vehicle peak power demands.

Still another object of this invention is to provide an energy storing secondary fluid power drive system storing power from the prime mover during the low power demand of the duty cycle and directly supplying it to the vehicle wheels during high power peaks of the vehicle duty cycle, thus permitting reduction in size of the prime mover and reduction in the torque capacity of the mechanical drive lines.

Still another object of this invention is to provide an energy storing secondary fluid power drive the action of which can be superimposed upon action of the primary mechanical power drive at the command of the operator during peak power requirements of the vehicle duty cycle and disengaged during low power requirements of the vehicle duty cycle.

Other objects and advantages of the present invention will be apparent from the following description, reference being had to the accompanying drawings showing clearly a preferred embodiment in which:

FIGURE 1 is a diagrammatic representation of a vehicle drive axle with schematically shown components of a secondary energy storing fluid power transmission and control system according to this invention;

FIGURE 2 is a sectional view through part of the vehicle drive axle and showing the components of the energy storing mechanism constituting the fluid power transmission and control system; and FIGURE 3 is a sectional view taken substantially along the plane of line 3—3 of FIGURE 2 showing details of the energy storing flywheel and its engaging mechanism.

Referring now to the drawing and particularly to FIGURE 1, a drive axle 10 is shown containing conventional differential and drive shafts (not shown) and terminating in axle ends 11, journalling vehicle drive wheels 12 and energy storing flywheels 13. Fluid motors 14 are mounted on axle ends 11 and drivingly connected to the energy storing flywheels 13. A variable flow pump 15 is provided driven by vehicle prime mover 16 and connected to a reservoir 17. The pump 15 conducts pressure fluid to the fluid motors 14 by ducts 18, 19, 20, 21, 22 and 23. A flywheel engagement control 24, operable by a pedal 25, transmits a control signal through ducts 26 and 27 to actuating mechanisms 29. The actuating mechanisms 29, through mechanisms to be described presently, drivingly connect or disconnect the energy storing flywheels 13 to the vehicle drive wheels 12 upon a signal from the control 24.

Referring now to FIGURE 2, the fluid power drive system is shown connected to one driven wheel, it being understood that the connection to the other wheel is the same. As can be seen in FIGURE 2 the drive axle 10 journals on bearings 30 and 31 wheel hub 32, connected through bolts 33 to wheel rim 34, mounting tire 35. The wheel hub 32 is provided with a cylindrical flange 36, which is drivingly connected through bolts 37 to flange extension 38 of drive shaft 39. The drive shaft 39 transmits power from a conventional differential drive 40. The shaft 39 is journalled in respect to the axle 10 by bearing 41. A flange 42 of the wheel hub 32 mounts through bolts, not shown, a fluid pressure operated cylinder 43, which is an integral part of shoe harness 44 (see FIGURE 3).

Still referring to FIGURE 2, the flywheel 13 through bolts 45 and sleeve 46 is rotatably mounted by bearings 47 and 48 in respect to the axle 10. The flywheel 13 is provided with an internal cylindrical surface 49, which is selectively engaged by shoes 50 equipped with conventional friction linings 51. As can be seen in FIGURE 3, the shoes 50 are contained within cylindrical surface 49 of the flywheel 13 and are pivoted for limited rotation, in respect to the shoe harness 44, by sockets 52 and are in operational contact with pistons 53, guided in the cylinder 43.

Referring again to FIGURE 2, the fluid for actuation of the cylinder 43 is supplied from annular groove 54 of cylindrical seal 55, through passages 56, 57, and 58, transfer tube 59 and passages 60 and 61.

The sleeve 46, drivingly connected to the flywheel 13, is equipped with a gear 62, drivingly engaged by a pinion 63, journalled on bearings 64 and 65. The pinion 63 is in turn drivingly connected through shaft 66 to the fluid motor 14, mounted through flange 67 on axle 10.

The variable flow pump 15 is driven by the prime mover 16 through pump shaft 68. The rotation of the pump drive shaft 68 induces a pumping action in the pump in a well known manner. The pump preferably is a pressure compensated pump of any type well known in the art which will maintain a preselected pump discharge pressure by changing the flow upon a pressure change signal. The pump has ports 78 and 79. The port 78 is connected through ducts 21 and 80 with the reservoir 17 and through ducts 21 and 22 to port 83 of the fluid motor 14. The port 79 is connected through ducts 18 and 19 with port 84 of the fluid motor 14.

The flywheel engagement control which differs from that of FIGURE 1 comprises a switch 85 connected to a battery 86. The switch operates a solenoid 87 provided on actuating mechanism 24. Each of the actuating mechanisms 24 has a valve body 89 in which is a valve spool 90 operated by the solenoid 87. The valve body 89 guides the valve spool 90 in a bore 92, which has a circumscribing annular space 93. The valve spool 90 is equipped with lands 94, 95, and 96, defining therebetween grooves 97 and 98. The groove 97 and space 99, defined by bore 92, are connected through lines 100 and 101 respectively to reservoir 17. The groove 98 is connected through lines 102 and 18 to the pump port 79. The annular space 93 is connected through passages 103, 104, and 105 to the annular groove 54, located in the cylindrical seal 55.

*Operation*

The power developed by the prime mover 16 is supplied to the differential drive 40 through a conventional mechanical transmission (not shown) and from the differential 40 to the drive shaft 39. From the drive shaft 39 through flange extension 38, wheel hub 32 and wheel rim 34 power is supplied to tires 35, causing them to rotate in respect to the drive axle 10, thus providing a propelling force for the vehicle. The fluid pump 15 driven by the prime mover 16 will develop a fluid flow under pressure. This flow under pressure, in a well known manner, is phased into ports 78 and 79. The amount of flow generated by the pump is governed by the pressure compensation of the pump. Since the pump 15 will maintain a constant pressure level at port 79, within its maximum flow capacity, the fluid under controlled pressure level will be supplied through lines 18 and 19 to the motor port 84 of the fluid motor 14. Fluid flow under pressure, passing through the fluid motor 14, in a well known manner, will develop rotation of the motor shaft 66, the fluid motor 14 converting the fluid energy into mechanical torque and rotation. The high pressure fluid from pump port 79, after performing work in fluid motor 14, will be returned at low pressure from the motor port 83 through lines 22 and 21 to the pump port 78. Since the line 22 is connected by line 80 to reservoir 17, the necessary make-up oil, required by the pump 15, can be introduced into the pump circuit.

The rotational energy developed in the fluid motor 14, through motor shaft 66, will be supplied to the pinion 63, working in meshing engagement with the gear 62. Since the gear 62, through sleeve 46, journalled by the bearings 47 and 48 is drivingly connected to the flywheel 13, the rotary motion, developed in the fluid motor 14, will be directly transmitted to the flywheel 13. Since, as explained above, the variable pump 15 will maintain a constant pressure at the port 84 of fluid motor 14, the fluid motor will develop a constant torque, gradually accelerating the flywheel 13. The flywheel 13 will thus be accelerated at a rate proportional to the pressure developed in the variable flow pump 15 until maximum flow capacity of the pump is reached. Upon reaching the maximum pump flow capacity, the flywheel 13 will attain its maximum rotational speed and maximum level of stored kinetic energy within its rotating mass. The pressure in the port 79 will drop to a level necessary to sustain throttling losses within fluid motor 14, windage losses of the flywheel 13 and mechanical losses within the gear train and flywheel journalling bearings. In the above condition, flywheel 13 is free to revolve, with shoes 50 being kept away from the internal cylindrical surface 49 of flywheel 13.

Introduction of fluid under pressure to cylinder 43 through the action of pistons 53 will move the shoes 50 outwardly around pivot sockets 52 gradually engaging the internal cylindrical surface 49 of the flywheel 13 with the lining 15. The friction torque thus generated between the shoes 50 and flywheel 13 will be transmitted through shoe harness 44 and flange 42 to wheel hub 32 and vehicle tires 35. Depending upon the force generated by cylinder 43, various amounts of torque can be transmitted from the flywheel 13 to the tires 35. On sudden application of comparatively large pressure to the cylinder 43, flywheel 13 can be coupled without any slip to the tires 35. The decelerating action of the vehicle, while performing work, will then tap the reservoir of kinetic energy within the flywheel 13, greatly increasing the torque at tires 35. It should be noted that in case the rotational speed of the flywheel 13 greatly exceeds the rotational speed of tires 35 a portion of the kinetic energy of the flywheel will be converted to heat at shoe linings 51, while transmitting the friction torque to the tires 35. In this way, depending upon the pressure developed in the cylinder 43, a proportional amount of torque, from the flywheel 13, can be superimposed upon the torque supplied to the tires 35 through drive shaft 39. It should also be noted that driving engagement, of the flywheel 13 will automatically reduce its speed of rotation, which in turn will bring the pump 15 below the range of its maximum flow. This condition will automatically raise the pressure in port 79 to its fully regulated level, generating proportional torque within fluid motor 14. This torque will be transmitted to the flywheel 13 and therefore through the action of the shoes 50 to the tires 35. In this way, upon engagement of the shoes 50, power will be supplied to tires 35 through drive shaft 39, through fluid motor 14 and through flywheel action of energy storing flywheel 13. A disengagement of shoes 50, from the flywheel internal surface 49, will leave at tires 35 only the power and torque transmitted through the drive shaft 39. At the same time, the pump 15 and fluid motor 14 will start automatically to accelerate the flywheel 13, until its maximum rotational velocity and therefore maximum kinetic energy level, corresponding to the maximum pump displacement, is reached. Then at reduced pressure level, the fluid power transmission and control system, in a manner as previously described, will maintain the rotational speed of flywheels 13 at a constant level, supplying only mechanical system losses.

The valve spool 90, in its position as shown, in FIGURE 2, connects the cylinder 43 with the low pressure of reservoir 17. Depressing pedal 25 will engage solenoid 87 which will move the valve spool 90 from right to left. This will connect cylinder 43 with the high pressure port 79 through passages 61 and 60, transfer tube 59, passages 58, 57, and 56, annular groove 54, passages 105, 104, 103, annular space 93, line 102, and duct 18. The actuation of the cylinder 43 will couple the flywheel 13 to the tires 35 transmitting energy as described above.

The pressure signal to the cylinder 43 can be generated and supplied in a variety of ways. When generated by the actuation of valve spools by solenoids as shown in FIGURE 2 the full pressure will be developed almost at once. However, the pressure in the cylinder 43 can be generated by manual power through a pedal and conventional components such as are used in an automobile brake system shown schematically as 24 in FIGURE 1. These systems have the advantage of allowing a selectable controlled amount of power to be released from the flywheel to the wheels depending upon the pressure exerted on the pedal.

When a multiplicity of fluid motors 14 are used, it is preferable to provide flow dividers between the variable pump and the individual motors, so that maximum rotational speed of each individual flywheel will be the same.

During period of peak loads the energy storing drive system would be engaged at the discretion of the operator. This will provide large tractive efforts at the vehicle wheels for periods of short duration. By regulation of the magnitude of the control pressure signal, supplied to the brake cylinders, when using one of these alternative systems, the driving effort contribution of energy storing system can be regulated. Furthermore, individual control can be provided for each individual cylinder whereby the driving effort contribution of the energy storing system, at each individual wheel, can be regulated.

On disengagement of the flywheels from the vehicle driving wheels during periods of light vehicle loading, the fluid power and control systems will automatically begin storing kinetic energy in the flywheels for future peak load demands. Since the energy stored in the flywheels is tapped by effectively coupling them to the vehicle wheels, very large tractive efforts can be developed at vehicle wheels, while maintaining the mechanical transmission of the vehicle, limited to transmission of comparatively low torques.

Although the invention has been described in conjunction with wheeled vehicles, it is equally applicable to track vehicles. Also, the system has been shown supplying power to the driven wheels of the vehicle, but it can also be used to supply power to the non-driven wheels.

While I have described a particular embodiment of this invention, various modifications may obviously be made without departing from the scope of my invention which I intend to define in the appended claims.

What is claimed is:

1. In a vehicle having a frame, a prime mover, ground engaging means, and transmission means disposed to drive at least one of said ground engaging means from said prime mover, the combination therewith of an auxiliary energy storing intermittent drive system, said energy storing drive comprising, means to store mechanical energy, fluid pressure energy translating means including pump and motor means interposed between said prime mover and said means to store the mechanical energy to supply energy to said means to store mechanical energy from said prime mover, and energizing means disposed to selectively functionally connect said means to store mechanical energy with at least one of said ground engaging means, whereby a driving effort derived from said means to store mechanical energy can be selectively superimposed on the primary driving effort.

2. The combination of claim 1 wherein said energy storing means includes flywheel means drivingly connected to said fluid motor.

3. The combination of claim 2 wherein said fluid pressure energy translating means includes means to maintain a relatively constant rate of acceleration of said flywheel means to its maximum rotational speed.

4. The combination of claim 2 wherein said means to selectively engage and disengage said means to store said mechanical energy includes flywheel engaging means carried by said ground engaging means disposed to frictionally engage said flywheel means.

5. The combination of claim 4 further characterized by said means to selectively engage and disengage said flywheel engaging means and said flywheel including a fluid pressure operated cylinder.

6. The combination of claim 2 further characterized by said pump means being a variable flow fluid pump, and automatic control means to vary delivery of said pump to maintain a relatively constant fluid pressure at said motor means during flywheel acceleration.

7. The combination of claim 6 wherein said control means includes means to reduce said pressure to a minimal level when said flywheel has reached its maximum speed.

8. In a vehicle having a frame, prime mover means, wheels disposed to propel said vehicle, and transmission means disposed to drive at least one of said wheels from said prime mover, the combination therewith of an energy storing drive system, said energy storing drive system comprising, a fluid pump drivingly connected to said prime mover means, at least one fluid motor operably connected to said fluid pump, a flywheel means driven by each fluid motor, and means to selectively engage and disengage each flywheel means with at least one of said wheels independent of said transmission means whereby mechanical energy stored in said flywheel means can be selectively supplied to said wheel means during periods of peak loads.

9. The combination of claim 8 further characterized by said means to selectively engage and disengage said flywheel means including shoe means carried by said wheel disposed to frictionally engage said flywheel means.

10. The combination of claim 9 further characterized by fluid pressure operated cylinder means disposed to operate said shoe means.

11. The combination of claim 10 further characterized by said means to selectively engage and disengage each flywheel means including means to transmit a fluid pressure signal to said fluid pressure operated cylinder means responsive to an operator command.

12. The combination of claim 11 wherein said means to transmit a fluid pressure signal includes valve means disposed to phase a fluid pressure signal to said fluid pressure operated cylinder means.

13. The combination of claim 9 further characterized by first and second fluid motors driven by said pump, and wherein each flywheel means is selectively engageable and disengageable with a separate wheel.

14. The combination of claim 8 wherein each of said flywheel means is connectable to a wheel driven by said transmission means.

15. The combination of claim 8 further characterized by control means to maintain a relatively constant pump discharge pressure during acceleration of said flywheel means.

16. The combination of claim 15 wherein said control means includes means to reduce said pressure to a minimal level when said flywheel has reached its maximum speed.

17. In a vehicle having a frame, prime mover means, wheels disposed to propel said vehicle, and transmission means disposed to drive at least one of said wheels from said prime mover, the combination therewith of an energy storing drive system, said energy storing drive system comprising, energy storing flywheel means journalled in respect to the frame, means to selectively engage and disengage said flywheel means with said wheels, a fluid pressure energy transmission and control system interposed between said flywheel means and said prime mover means, said system including a variable flow fluid pump equipped with a pressure compensated control to vary the flow of the pump in respect to the system pressure, fluid motors drivingly connected to each of said flywheel means, and fluid responsive engaging control means to supply a modulated control signal to said means to engage and disengage said flywheel means, whereby a controlled amount of the mechanical energy stored in said flywheel means can be transmitted to said wheels.

18. The combination of claim 17 wherein said means to selectively engage and disengage said flywheel means includes shoe means disposed to frictionally engage said flywheel means.

19. In a vehicle having a frame, a prime mover, ground engaging means and transmission means disposed to drive at least one of said ground engaging means from said prime mover, the combination therewith of an auxilliary energy storing intermittent drive system comprising, means to extract mechanical energy from said prime mover, means to store the extracted mechanical energy, driving means disposed to drivingly engage said ground engaging means and said means to store the extracted mechanical energy independent of said transmission means, and actuating means disposed to selectively functionally connect and disconnect said driving means with said ground engaging means, whereby the driving effort from energy stored in said means to store mechanical energy can be superimposed upon the driving effort of the vehicle independent of said transmission.

20. The combination of claim 19 wherein said means to store said mechanical energy includes flywheel means, and said driving means includes flywheel engaging means, and said actuating means includes means to selectively engage and disengage said flywheel engaging means with said flywheel.

21. The combination of claim 20 wherein said frictional engaging means includes friction shoe means.

22. The combination of claim 21 wherein said actuating means includes operator controlled fluid actuated cylinder means.

23. The combination of claim 20 wherein independent flywheel means and flywheel engaging means are provided in conjunction with at least two ground engaging means.

References Cited
UNITED STATES PATENTS

| | | | |
|---|---|---|---|
| 2,137,574 | 11/1938 | Kromer | 180—1 |
| 2,443,770 | 6/1948 | Kasschau | 180—65 |
| 2,935,899 | 5/1960 | Nallinger | 180—1 X |
| 3,180,080 | 4/1965 | Budzich et al. | 180—66 |

LEO FRIAGLIA, *Primary Examiner.*

MILTON L. SMITH, *Examiner.*